US012780211B2

United States Patent

(12) United States Patent
(10) Patent No.: US 12,780,211 B2
(45) Date of Patent: Nov. 3, 2026

Terabayashi

(54) VEHICLE DRIVING ASSISTANCE APPARATUS

(71) Applicant: TOYOTA JIDOSHA KABUSHIKI KAISHA, Aichi (JP)

(72) Inventor: Iori Terabayashi, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 1 day.

(21) Appl. No.: 18/946,917

(22) Filed: Nov. 14, 2024

(65) Prior Publication Data

US 2025/0162590 A1 May 22, 2025

(30) Foreign Application Priority Data

Nov. 21, 2023 (JP) ................................. 2023-197315

(51) Int. Cl.

*B60W 30/18* (2012.01)
*B60W 30/14* (2006.01)
*B60W 50/00* (2006.01)
*B60W 60/00* (2020.01)

(52) U.S. Cl.

CPC .... *B60W 30/18163* (2013.01); *B60W 30/143* (2013.01); *B60W 50/00* (2013.01); *B60W 60/001* (2020.02); *B60W 2050/0083* (2013.01); *B60W 2520/125* (2013.01)

(58) Field of Classification Search

CPC ......... B60W 30/18163; B60W 30/143; B60W 50/00; B60W 60/001; B60W 2050/0083; B60W 2520/125; B60W 2520/12; B60W 2552/53; B60W 2720/12

See application file for complete search history.

(56) References Cited

U.S. PATENT DOCUMENTS 10,077,056 B1 * 9/2018 Fields .................... B60W 40/09
10,793,147 B2 * 10/2020 Kaminade .............. B60Q 9/008
10,870,349 B2 * 12/2020 Uejima .................. G08G 1/167
10,953,883 B2 * 3/2021 Sakaguchi ...... B60W 30/18163
10,981,569 B2 * 4/2021 Hashimoto ........... B60W 10/06
11,014,563 B2 * 5/2021 Hashimoto ........... B60W 30/12
11,072,334 B2 * 7/2021 Aoki ..................... B60W 10/20
11,267,473 B2 * 3/2022 Takahashi ............. B60W 40/04
11,279,360 B2 * 3/2022 Fukuda ................ G06V 20/584
11,358,594 B2 * 6/2022 Fujii ................. B60W 30/0953

(Continued)

FOREIGN PATENT DOCUMENTS

JP 2018-101400 A 6/2018

*Primary Examiner* — Lindsay M Low
*Assistant Examiner* — Brian R Kirby
(74) *Attorney, Agent, or Firm* — HAUPTMAN HAM, LLP

(57) ABSTRACT

A vehicle driving assistance apparatus executes a lane change control of autonomously performing a lane change of an own vehicle. The apparatus acquires actual lane change characteristics during a manual lane change period, and performs an autonomous lane change by the lane change control in accordance with target lane change characteristics set based on the actual lane change characteristics. The apparatus acquires, as the actual lane change characteristics, an actual required time and an actual maximum lateral speed, and sets, as the target lane change characteristics, a target required time based on the actual required time and a target maximum lateral speed based on the actual maximum lateral speed.

6 Claims, 5 Drawing Sheets

(56) References Cited

U.S. PATENT DOCUMENTS

| | | | | |
|---|---|---|---|---|
| 11,529,950 | B2 * | 12/2022 | Xiao | B60W 30/09 |
| 2012/0265431 | A1 * | 10/2012 | Hayakawa | B60T 7/22 701/301 |
| 2015/0166069 | A1 * | 6/2015 | Engelman | B60W 30/12 701/23 |
| 2016/0225261 | A1 * | 8/2016 | Matsumoto | G08G 1/167 |
| 2017/0151982 | A1 * | 6/2017 | Fujii | B62D 15/0255 |
| 2017/0174221 | A1 * | 6/2017 | Vaughn | B60W 40/09 |
| 2017/0305434 | A1 * | 10/2017 | Ratnasingam | B60K 35/10 |
| 2017/0305465 | A1 * | 10/2017 | Mielenz | B60W 30/18163 |
| 2018/0113461 | A1 * | 4/2018 | Potnis | B60W 30/182 |
| 2018/0170392 | A1 * | 6/2018 | Yang | B60K 35/28 |
| 2018/0297639 | A1 * | 10/2018 | Fujii | B62D 15/0255 |
| 2019/0187706 | A1 * | 6/2019 | Zhou | B60W 30/18009 |
| 2020/0023839 | A1 * | 1/2020 | Yan | B60W 30/0956 |
| 2020/0070889 | A1 * | 3/2020 | Fukuda | G05D 1/0088 |
| 2020/0247400 | A1 * | 8/2020 | Fujii | B60W 30/0953 |
| 2021/0009133 | A1 * | 1/2021 | Mcnew | B60W 30/0956 |
| 2021/0064891 | A1 * | 3/2021 | Kimura | E01C 23/01 |
| 2021/0171042 | A1 * | 6/2021 | Hayakawa | G08G 1/167 |
| 2021/0276561 | A1 * | 9/2021 | Hayakawa | B60W 30/08 |
| 2022/0185296 | A1 * | 6/2022 | Zheng | B60W 30/12 |
| 2023/0055183 | A1 * | 2/2023 | Itazuri | B60W 50/14 |
| 2023/0202479 | A1 * | 6/2023 | Horiguchi | B60W 30/165 701/93 |

* cited by examiner

VEHICLE DRIVING ASSISTANCE APPARATUS

CROSS-REFERENCE TO RELATED APPLICATIONS

This application claims priority to Japanese patent application No. JP 2023-197315 filed on Nov. 21, 2023, the content of which is hereby incorporated by reference in its entirety.

BACKGROUND

Field

The present invention relates to a vehicle driving assistance apparatus.

Description of the Related Art

There is known a vehicle driving assistance apparatus which has a function of autonomously changing lanes of a vehicle. In this regard, it has been pointed out that when autonomously changing lanes of a vehicle, it is desirable to change lanes of the vehicle in a manner preferred by a driver of the vehicle (for example, refer to JP 2018-101400 A).

There is room for improvement in a specific configuration required to autonomously change lanes in a manner preferred by the driver.

SUMMARY

An object of the present invention is to provide a vehicle driving assistance apparatus which can autonomously change lanes of a vehicle in a manner preferred by the driver.

A vehicle driving assistance apparatus according to the present invention comprises an electronic control unit which executes a lane change control of autonomously performing a lane change of an own vehicle. The electronic control unit is configured to acquire actual lane change characteristics during a manual lane change period. The manual lane change period is a period of time when an operator of the own vehicle carries out a manual lane change of manually changing lanes of the own vehicle. The actual lane change characteristics are characteristics relating to the manual lane change. The electronic control unit is further configured to perform an autonomous lane change of changing lanes of the own vehicle by the lane change control in accordance with target lane change characteristics set based on the actual lane change characteristics. The electronic control unit is further configured to acquire, as the actual lane change characteristics, (i) an actual required time and (ii) an actual maximum lateral speed. The actual required time is a period of time from a point of time when the operator brings a state of the own vehicle into a first state to a point of time when the operator brings the state of the own vehicle into a second state other than the first state. The actual maximum lateral speed is a maximum value of a lateral speed which is a moving speed of the own vehicle in a lateral direction of the own vehicle. The electronic control unit is further configured to set, as the target lane change characteristics, (i) a target required time based on the actual required time and (ii) a target maximum lateral speed based on the actual maximum lateral speed. The target required time is a target period of time from a point of time when the electronic control unit brings the state of the own vehicle into the first state to a point of time when the electronic control unit brings the state of the own vehicle into the second state. The target maximum lateral speed is a target value of the maximum value of the lateral speed.

When the operator carries out the manual lane change of the own vehicle, the operator's preferences regarding the lane change are reflected in the actual required time from the point of time when the operator brings the state of the own vehicle into the first state to the point of time when the operator brings the state of the own vehicle into the second state other than the first state. The actual required time is, for example, a period of time from a point of time when the operator starts to activate blinkers to a point of time when the operator starts to move the own vehicle in the lateral direction, or a period of time from a point of time when the operator starts to move the own vehicle in the lateral direction to a point of time when the operator starts to cause the own vehicle to cross a lane marking. Also, when the operator carries out the manual lane change of the own vehicle, the operator's preferences regarding the lane change are reflected in the actual maximum lateral speed (i.e., the maximum value of the lateral speed of the own vehicle).

The vehicle driving assistance apparatus according to the present invention (i) acquires the actual required time and the actual maximum lateral speed, (ii) sets the target required time (i.e., the target period of time from the point of time when the electronic control unit brings the state of the own vehicle into the first state to the point of time when the electronic control unit brings the state of the own vehicle into the second state) based on the actual required time, (iii) sets the target maximum lateral speed (i.e., the target value of the maximum value of the lateral speed of the own vehicle) based on the actual maximum lateral speed, and (iv) performs the autonomous lane change in accordance with the target required time and the target maximum lateral speed. Thus, the vehicle driving assistance apparatus can ensure the autonomous lane change of the own vehicle in a manner preferred by the operator.

In the vehicle driving assistance apparatus according to an aspect of the present invention, the electronic control unit may be configured to acquire, as the actual lane change characteristics, an actual maximum lateral speed reaching time. The actual maximum lateral speed reaching time is a period of time from a point of time when the operator starts to move the own vehicle in the lateral direction to a point of time when the lateral speed reaches a maximum lateral speed. The electronic control unit may be further configured to set, as the target lane change characteristics, a target maximum lateral speed reaching time. The target maximum lateral speed reaching time is a target period of time from a point of time when the electronic control unit starts to move the own vehicle in the lateral direction to a point of time when the electronic control unit causes the lateral speed to reach the maximum lateral speed.

When the operator carries out the manual lane change of the own vehicle, the operator's preferences regarding the lane change are reflected in the actual maximum lateral speed reaching time (i.e., the period of time from the point of time when the operator starts to move the own vehicle in the lateral direction to the point of time when the lateral speed of the own vehicle reaches the maximum lateral speed).

The vehicle driving assistance apparatus according to this aspect of the present invention (i) acquires the actual maximum lateral speed reaching time, (ii) sets the target maximum lateral speed reaching time (i.e., the target period of time from the point of time when the electronic control unit starts to move the own vehicle in the lateral direction to the point of time when the electronic control unit causes the lateral speed of the own vehicle to reach the maximum lateral speed) based on the actual maximum lateral speed reaching time, and (iii) performs the autonomous lane change in accordance with the target maximum lateral speed reaching time. Thus, the vehicle driving assistance apparatus can ensure the autonomous lane change of the own vehicle in a manner preferred by the operator.

In the vehicle driving assistance apparatus according to another aspect of the present invention, the electronic control unit may be configured to acquire, as the actual lane change characteristics, (i) an actual maximum lateral acceleration rate and (ii) an actual maximum lateral acceleration rate gradient. The actual maximum lateral acceleration rate is a maximum value of a lateral acceleration rate which is an acceleration rate of the own vehicle in the lateral direction. The actual maximum lateral acceleration rate gradient is a maximum value of a lateral acceleration rate gradient which is a rate of change of the acceleration rate of the own vehicle. The electronic control unit may be further configured to set, as the target lane change characteristics, (i) a target maximum lateral acceleration rate based on the actual maximum lateral acceleration rate and (ii) a target maximum lateral acceleration rate gradient based on the actual maximum lateral acceleration rate gradient. The target maximum lateral acceleration rate is a target value of the maximum value of the lateral acceleration rate. The target maximum lateral acceleration rate gradient is a target value of the maximum value of the lateral acceleration rate gradient.

When the operator carries out the manual lane change of the own vehicle, the operator's preferences regarding the lane change are reflected in the actual maximum lateral acceleration rate (i.e., the maximum value of the lateral acceleration rate of the own vehicle) and the actual maximum lateral acceleration rate gradient (i.e., the maximum value of the lateral acceleration rate gradient of the own vehicle).

The vehicle driving assistance apparatus according to this aspect of the present invention (i) acquires the actual maximum lateral acceleration rate and the actual maximum lateral acceleration rate gradient, (ii) sets the target maximum lateral acceleration rate (i.e., the target value of the maximum value of the lateral acceleration rate of the own vehicle) based on the actual maximum lateral acceleration rate, (iii) sets the target maximum lateral acceleration rate gradient (i.e., the target value of the maximum value of the lateral acceleration rate gradient of the own vehicle) based on the actual maximum lateral acceleration rate gradient, and (iv) perform the autonomous lane change in accordance with the target maximum lateral acceleration rate and the target maximum lateral acceleration rate gradient. Thus, the vehicle driving assistance apparatus can ensure the autonomous lane change of the own vehicle in a manner preferred by the operator.

In the vehicle driving assistance apparatus according to further another aspect of the present invention, the electronic control unit is configured to acquire, as the actual lane change characteristics, (i) an actual lateral speed changing profile, (ii) an actual lateral acceleration rate changing profile, and (iii) an actual lateral acceleration rate gradient changing profile. The actual lateral speed changing profile is a trajectory of the lateral speed which changes during the manual lane change period. The actual lateral acceleration rate changing profile is a trajectory of a lateral acceleration rate which is an acceleration rate of the own vehicle in the lateral direction and changes during the manual lane change period. The actual lateral acceleration rate gradient changing profile is a trajectory of a lateral acceleration rate gradient which is a rate of change of the acceleration rate of the own vehicle and changes during the manual lane change period. The electronic control unit may be further configured to set, as the target lane change characteristics, (i) a target lateral speed changing profile based on the actual lateral speed changing profile, (ii) a target lateral acceleration rate changing profile based on the actual lateral acceleration rate changing profile, and (iii) a target lateral acceleration rate gradient changing profile based on the actual lateral acceleration rate gradient changing profile. The target lateral speed changing profile is a trajectory of a target value of the lateral speed to be changed by the lane change control. The target lateral acceleration rate changing profile is a trajectory of a target value of the lateral acceleration rate to be changed by the lane change control. The target lateral acceleration rate gradient changing profile is a trajectory of a target value of the lateral acceleration rate gradient to be changed by the lane change control.

When the operator carries out the manual lane change of the own vehicle, the operator's preferences regarding the lane change are reflected in the actual lateral speed changing profile (i.e., a manner in which the lateral speed of the own vehicle changes), the actual lateral acceleration rate changing profile (i.e., a manner in which the lateral acceleration rate of the own vehicle changes), and the actual lateral acceleration rate gradient changing profile (i.e., a manner in which the lateral acceleration rate gradient of the own vehicle changes).

The vehicle driving assistance apparatus according to this aspect of the present invention (i) acquires the actual lateral speed changing profile, the actual lateral acceleration rate changing profile, and the actual lateral acceleration rate gradient changing profile, (ii) sets, as the target lane change characteristics, the target lateral speed changing profile (i.e., the trajectory of the target value of the lateral speed of the own vehicle changed by the lane change control) based on the actual lateral speed changing profile, (iii) sets, as the lane change characteristics, the target lateral acceleration rate changing profile (i.e., the trajectory of the target value of the lateral acceleration rate of the own vehicle changed by the lane change control) based on the actual lateral acceleration rate changing profile, (iv) sets, as the lane change characteristics, the target lateral acceleration rate gradient changing profile (i.e., the trajectory of the target value of the lateral acceleration rate gradient of the own vehicle changed by the lane change control) based on the actual lateral acceleration rate gradient changing profile, and (v) performs the autonomous lane change in accordance with the target lateral speed changing profile, the target lateral acceleration rate changing profile, and the target lateral acceleration rate gradient changing profile. Thus, the vehicle driving assistance apparatus can ensure the autonomous lane change of the own vehicle in a manner preferred by the operator.

In the vehicle driving assistance apparatus according to further another aspect of the present invention, the electronic control unit may be configured to acquire, as the actual required time, (i) an actual lateral movement start time, (ii) an actual crossing start time, and (iii) an actual crossing finishing time. The actual lateral movement start time is a period of time from a point of time when the operator starts to carry out an operation indicating an intension to carry out the manual lane change to a point of time when the operator starts to move the own vehicle in the lateral direction. The actual crossing start time is a period of time from the point of time when the operator starts to move the own vehicle in the lateral direction to a point of time when the own vehicle starts to cross a lane marking. The actual crossing finishing time is a period of time from the point of time when the own vehicle starts to cross the lane marking to a point of time when the own vehicle finishes crossing the lane marking. The electronic control unit may be further configured to set, as the target required time, (i) a target lateral movement start time based on the actual lateral movement start time, (ii) a target crossing start time based on the actual crossing start time, and (iii) a target crossing finishing time based on the actual crossing finishing time. The target lateral movement start time is a target period of time from a point of time when the operator carries out an operation of requesting an execution of the lane change control to a point of time when the electronic control unit starts to move the own vehicle in the lateral direction. The target crossing start time is a target period of time from the point of time when the electronic control unit starts to move the own vehicle in the lateral direction to a point of time when the electronic control unit causes the own vehicle to start to cross the lane marking. The target crossing finishing time is a target period of time from the point of time when the electronic control unit causes the own vehicle to start to cross the lane marking to a point of time when the electronic control unit causes the own vehicle to finish crossing the lane marking.

The operator's preferences regarding the lane change are reflected in (i) the actual lateral movement start time (i.e., the period of time from the point of time when the operator starts to carry out the operation indicating the intension to carry out the manual lane change operation to the point of time when the operator starts to move the own vehicle in the lateral direction), (ii) the actual crossing start time (i.e., the period of time from the point of time when the operator starts to move the own vehicle in the lateral direction to the point of time when the own vehicle starts to cross the lane marking), and (iii) the actual crossing finishing time (i.e., the period of time from the point of time when the operator starts to move the own vehicle in the lateral direction to the point of time when the own vehicle starts to cross the lane marking).

The vehicle driving assistance apparatus according to this aspect of the present invention (i) acquires the actual lateral movement start time, the actual crossing start time, and the actual crossing finishing time, (ii) sets the target lateral movement start time (i.e., the target period of time from the point of time when the operator carries out the operation of requesting the execution of the lane change control to the point of time when the electronic control unit starts to move the own vehicle in the lateral direction) based on the actual lateral movement start time, (iii) sets the target crossing start time (i.e., the target period of time from the point of time when the electronic control unit starts to move the own vehicle in the lateral direction to the point of time when the electronic control unit causes the own vehicle to start to cross the lane marking) based on the actual crossing start time, (iv) sets the target crossing finishing time (i.e., the target period of time from the point of time when the electronic control unit causes the own vehicle to start to cross the lane marking to the point of time when the electronic control unit causes the own vehicle to finish crossing the lane marking) based on the actual crossing finishing time, and (v) performs the autonomous lane change in accordance with the target lateral movement start time, the target crossing start time, and the target crossing finishing time. Thus, the vehicle driving assistance apparatus can ensure the autonomous lane change of the own vehicle in a manner preferred by the operator.

It should be noted that the vehicle driving assistance apparatus according to the present invention may be configured to use an AI technique such as a machine learning or a deep learning to learn the actual required time.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

Figure 1:
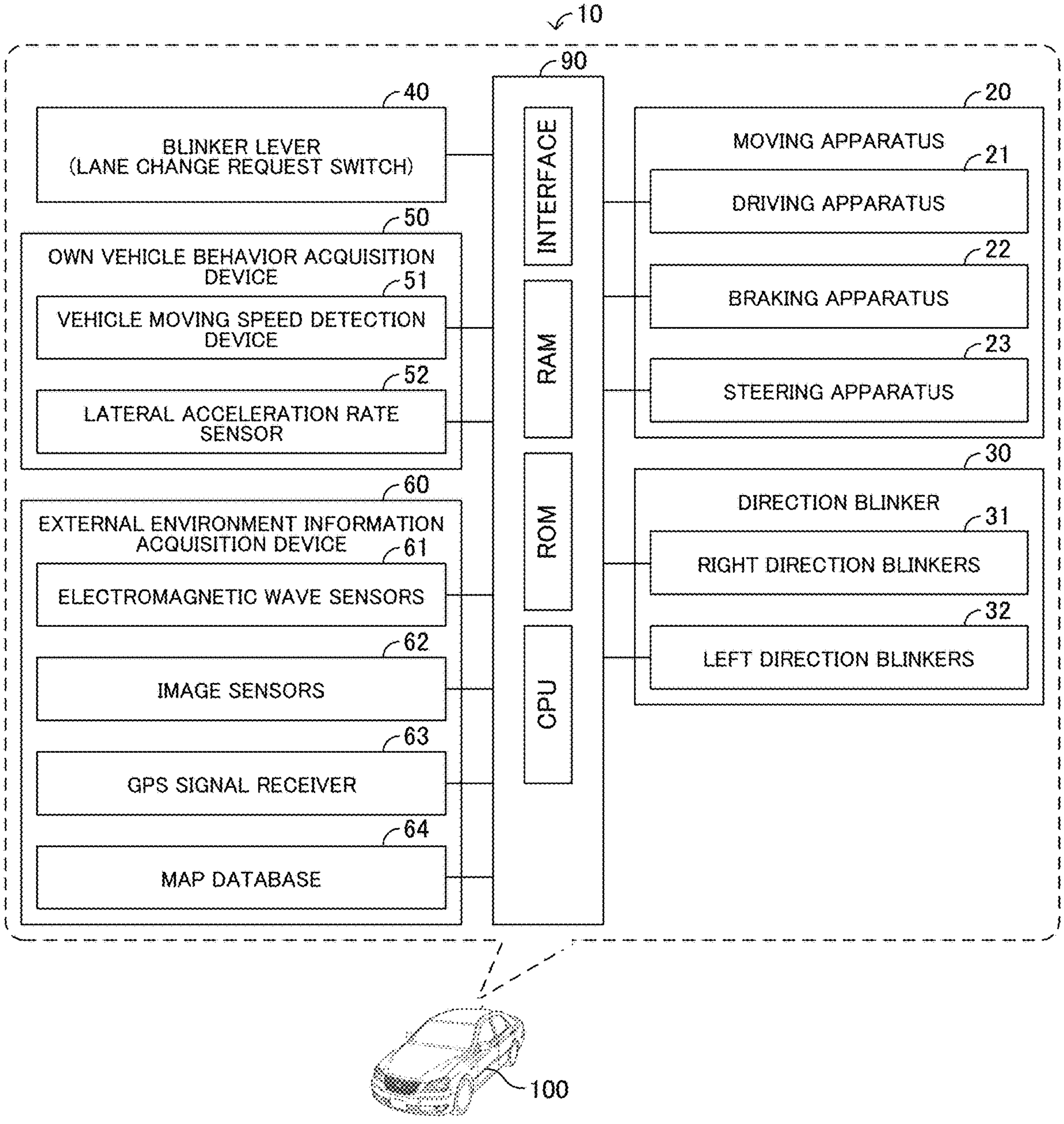
FIG. 1 is a view which shows a vehicle driving assistance apparatus according to an embodiment of the present invention.

Hereinafter, a vehicle driving assistance apparatus 10 according to an embodiment of the present invention will be described with reference to the drawings. FIG. 1 illustrates the vehicle driving assistance apparatus 10 according to an embodiment of the present invention. The vehicle driving assistance apparatus 10 is mounted on an own vehicle 100. Hereinafter, the vehicle driving assistance apparatus 10 will be described by exemplifying a situation where an operator of the own vehicle 100 is a driver of the own vehicle 100, i.e., a person who rides on the own vehicle 100 and drives the own vehicle 100.

However, the operator of the own vehicle 100 may be a remote operator of the own vehicle 100, i.e., an operator who is not in the own vehicle 100 but remotely drives the own vehicle 100. When the operator of the own vehicle 100 is the remote operator, the vehicle driving assistance apparatus 10 is mounted on the own vehicle 100 and a remote control facility installed outside the own vehicle 100 for remotely driving the own vehicle 100, and the functions of the vehicle driving assistance apparatus 10 described below are shared by the vehicle driving assistance apparatus 10 mounted on the own vehicle 100 and the vehicle driving assistance apparatus 10 mounted on the remote control facility.

As illustrated in FIG. 1, the vehicle driving assistance apparatus 10 includes an ECU (electronic control device) 90 as a control device. The ECU 90 includes a microcomputer as a main component. The microcomputer includes a CPU, a storage medium such as ROM, RAM and a non-volatile memory, an interface, and the like. The CPU is configured or programmed to realize various functions by executing instructions, programs, or routines stored in the storage medium. In particular, in the present embodiment, the vehicle driving assistance apparatus 10 stores programs of realizing various controls executed by the vehicle driving assistance apparatus 10 in the storage medium.

In the present embodiment, the vehicle driving assistance apparatus 10 includes only one ECU 90, but may include a plurality of ECUs, and may be configured to share the functions of the vehicle driving assistance apparatus 10 described below by the respective ECU.

The vehicle driving assistance apparatus 10 may be configured to be able to update the programs stored in the storage medium by wireless communication (for example, internet communication) with external apparatuses.

Further, the own vehicle 100 is equipped with a moving apparatus 20, direction blinkers 30, a blinker lever 40, an own vehicle behavior acquisition device 50, and an external environment information acquisition device 60.

The moving apparatus 20 is an apparatus which moves the own vehicle 100, and the vehicle driving assistance apparatus 10 can move the own vehicle 100 by controlling operations of the moving apparatus 20. The moving apparatus 20 includes a driving apparatus 21, a braking apparatus 22, and a steering apparatus 23.

The driving apparatus 21 is electrically connected to the ECU 90. The vehicle driving assistance apparatus 10 can control a driving force applied to the own vehicle 100 by controlling operations of the driving apparatus 21, and thus can accelerate the own vehicle 100.

The braking apparatus 22 is also electrically connected to the ECU 90. The vehicle driving assistance apparatus 10 can control a braking force applied to the own vehicle 100 by controlling operations of the braking apparatus 22, and thus can decelerate the own vehicle 100.

The steering apparatus 23 is also electrically connected to the ECU 90. The vehicle driving assistance apparatus 10 can control a steering force applied to the own vehicle 100 by controlling operations of the steering apparatus 23, and thus can steer the own vehicle 100.

The direction blinkers 30 are devices which blink to indicate a direction in which the own vehicle 100 turns. The direction blinkers 30 include right direction blinkers 31 and left direction blinkers 32. The right direction blinkers 31 and the left direction blinkers 32 are electrically connected to the ECU 90, respectively. The vehicle driving assistance apparatus 10 can selectively blink the right direction blinkers 31 and the left direction blinkers 32.

The blinker lever 40 is a device operated by the driver and is electrically connected to the ECU 90. When the driver operates the blinker lever 40 to satisfy a predetermined condition (i.e., a condition in which it is determined that blinking of the right direction blinkers 31 or the left direction blinkers 32 is requested), the vehicle driving assistance apparatus 10 causes the right direction blinkers 31 or the left direction blinkers 32 to blink according to a type of the driver's operation. On the other hand, when the driver operates the blinker lever 40 to satisfy another condition (i.e., a condition in which it is determined that an execution of a lane change control described later is requested), the vehicle driving assistance apparatus 10 determines that the execution of the lane change control described later is requested. As described above, in the present embodiment, the blinker lever 40 also functions as a lane change switch for the driver requesting the execution of the lane change control. However, a lane change switch may be provided separately from the blinker lever 40.

The own vehicle behavior acquisition device 50 is a device which acquires own vehicle behavior information IE, i.e., data related to behaviors of the own vehicle 100. In the present embodiment, the own vehicle behavior acquisition device 50 includes a vehicle moving speed detection device 51 and a lateral acceleration rate sensor 52.

The vehicle moving speed detection device 51 is electrically connected to the ECU 90. The vehicle driving assistance apparatus 10 acquires a moving speed of the own vehicle 100 as an own vehicle moving speed V by the vehicle moving speed detection device 51.

The lateral acceleration rate sensor 52 is also electrically connected to the ECU 90. The vehicle driving assistance apparatus 10 acquires an acceleration rate of the own vehicle 100 in a lateral direction as a lateral acceleration rate Gy by the lateral acceleration rate sensor 52.

In addition, the external environment information acquisition device 60 is a device which acquires external environment information IO, i.e., information related to external environments or surrounding conditions of the own vehicle 100. The vehicle driving assistance apparatus 10 acquires the external environment information IO by the external environment information acquisition device 60. In the present embodiment, the external environment information acquisition device 60 includes electromagnetic wave sensors 61, image sensors 62, a GPS signal receiver 63, and a map database 64.

The electromagnetic wave sensor 61 is a sensor such as a millimeter wave radar or a Lidar, and is electrically connected to the ECU 90. The vehicle driving assistance apparatus 10 acquires, by the electromagnetic wave sensors 61, information on objects existing around the own vehicle 100 (for example, object information such as a distance between the own vehicle 100 and another vehicle) as external environment information IO.

The image sensor 62 is a sensor such as a camera sensor and is electrically connected to the ECU 90. The vehicle driving assistance apparatus 10 acquires image information IC, i.e., image data obtained by capturing images of surroundings of the own vehicle 100 by the image sensors 62 as the external environment information IO.

The GPS signal receiver 63 is electrically connected to the ECU 90. The vehicle driving assistance apparatus 10 acquires GPS signals via the GPS signal receiver 63, and acquires a present position of the own vehicle 100 based on the acquired GPS signals.

The map database 64 is a device in which map information is recorded, and is electrically connected to the ECU 90. The vehicle driving assistance apparatus 10 compares the present position of the own vehicle 100 acquired based on the GPS signals with the map information recorded in the map database 64, thereby acquiring information on an area in which the own vehicle 100 is moving (for example, road information such as information on a road on which the own vehicle 100 is moving) as the external environment information IO.

<Operations of Vehicle Driving Assistance Apparatus>

Figure 2:
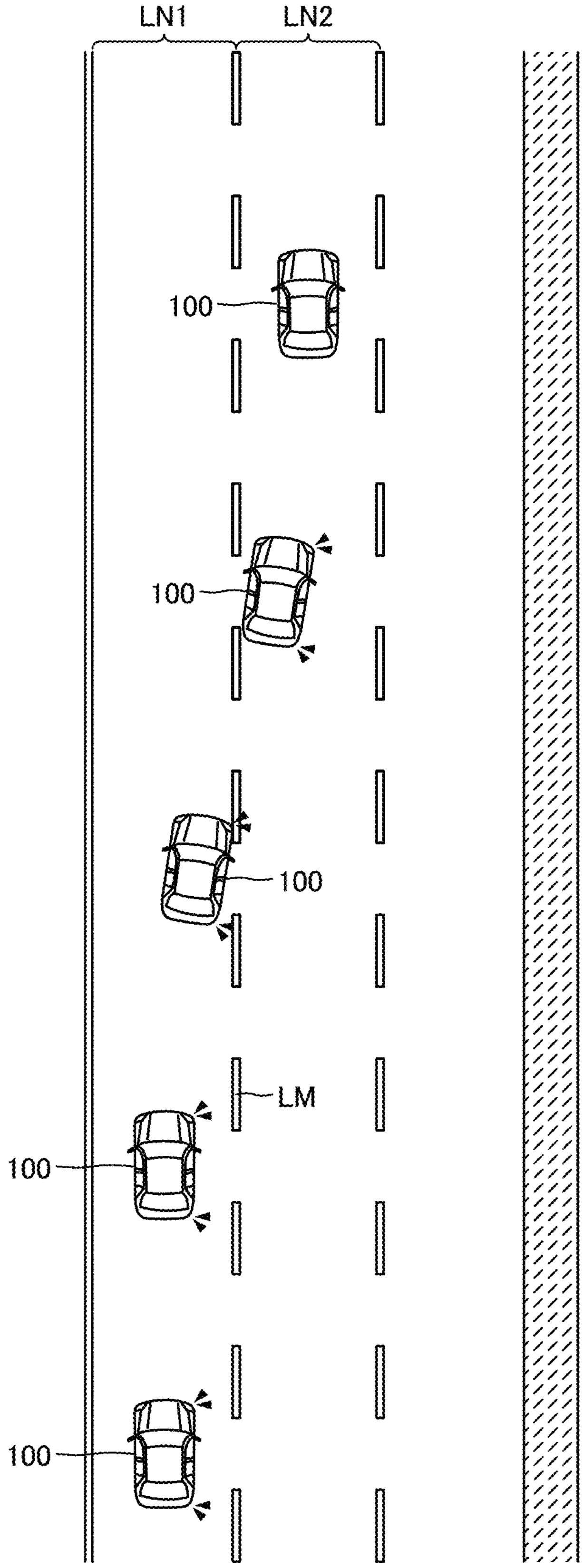
FIG. 2 is a view which shows a manual lane change of an own vehicle.
Figure 3:
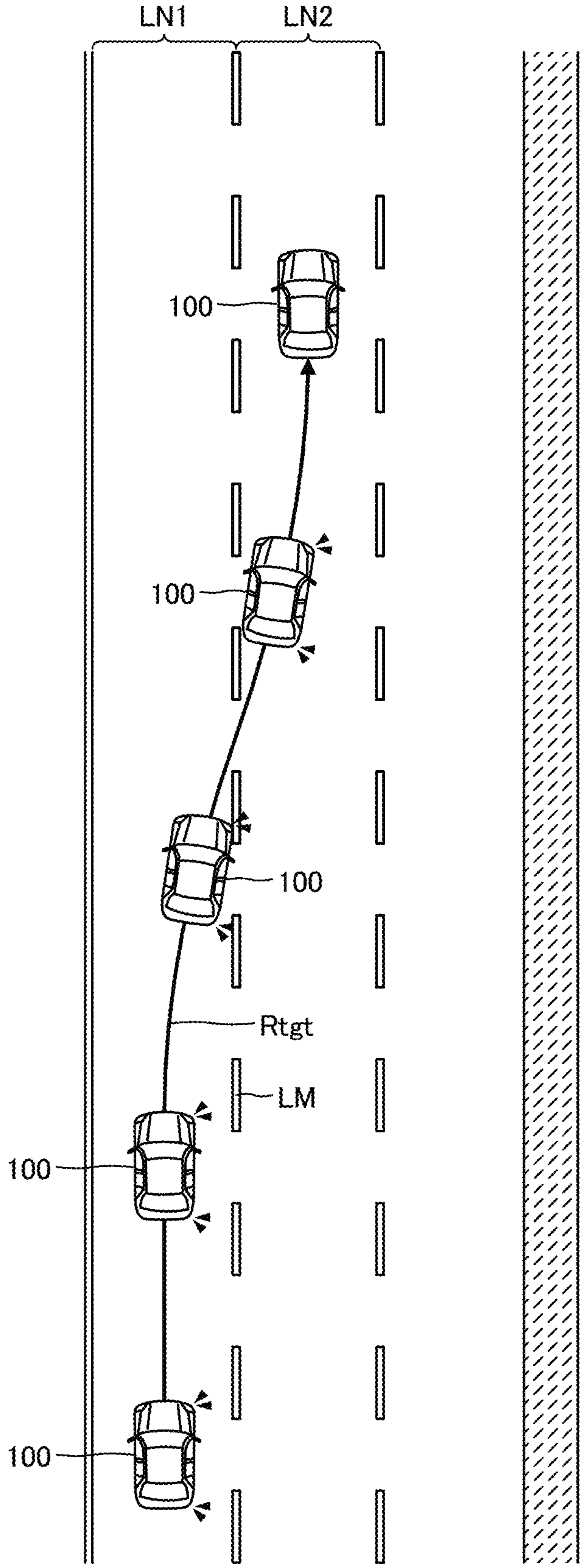
FIG. 3 is a view which shows a lane change of the own vehicle by a lane change control.

As shown in FIG. 2, the vehicle driving assistance apparatus 10 is configured to (i) acquire, as actual lane change characteristics, characteristics related to a manual lane change during a manual lane change period, i.e., a period of time during which the driver of the own vehicle 100 carries out a manual lane change of manually changing a lane of the own vehicle 100, and (ii) perform an autonomous lane change, i.e., a lane change of the own vehicle 100 by the lane change control in accordance with target lane change characteristics set based on the acquired actual lane change characteristics as shown in FIG. 3.

The lane change control is one of autonomous driving controls, and as shown in FIG. 3, autonomously performs the lane change of the own vehicle 100 from a present moving lane LN1 to a designated neighboring lane LN2. The present moving lane LN1 is a lane in which the own vehicle 100 is currently moving. The designated neighboring lane LN2 is a lane in which vehicles can move in the same direction as a moving direction of the own vehicle 100, and is a lane which is adjacent to the present moving lane LN1 and is on the side indicated by the direction blinkers 30 in operation.

Figure 4:
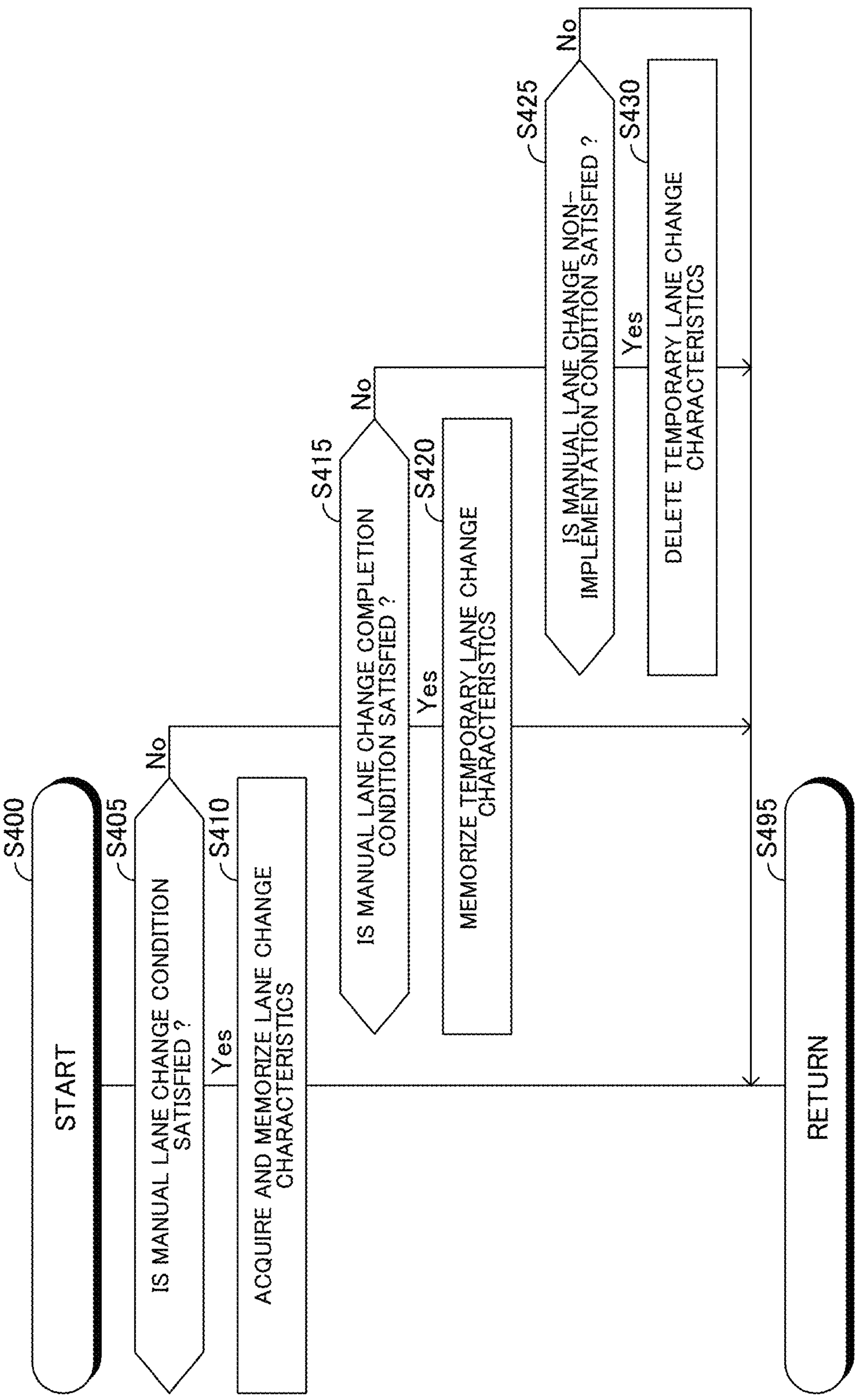
FIG. 4 is a view which shows a flowchart of a routine executed by the vehicle driving assistance apparatus according to the embodiment of the present invention.
Figure 5:
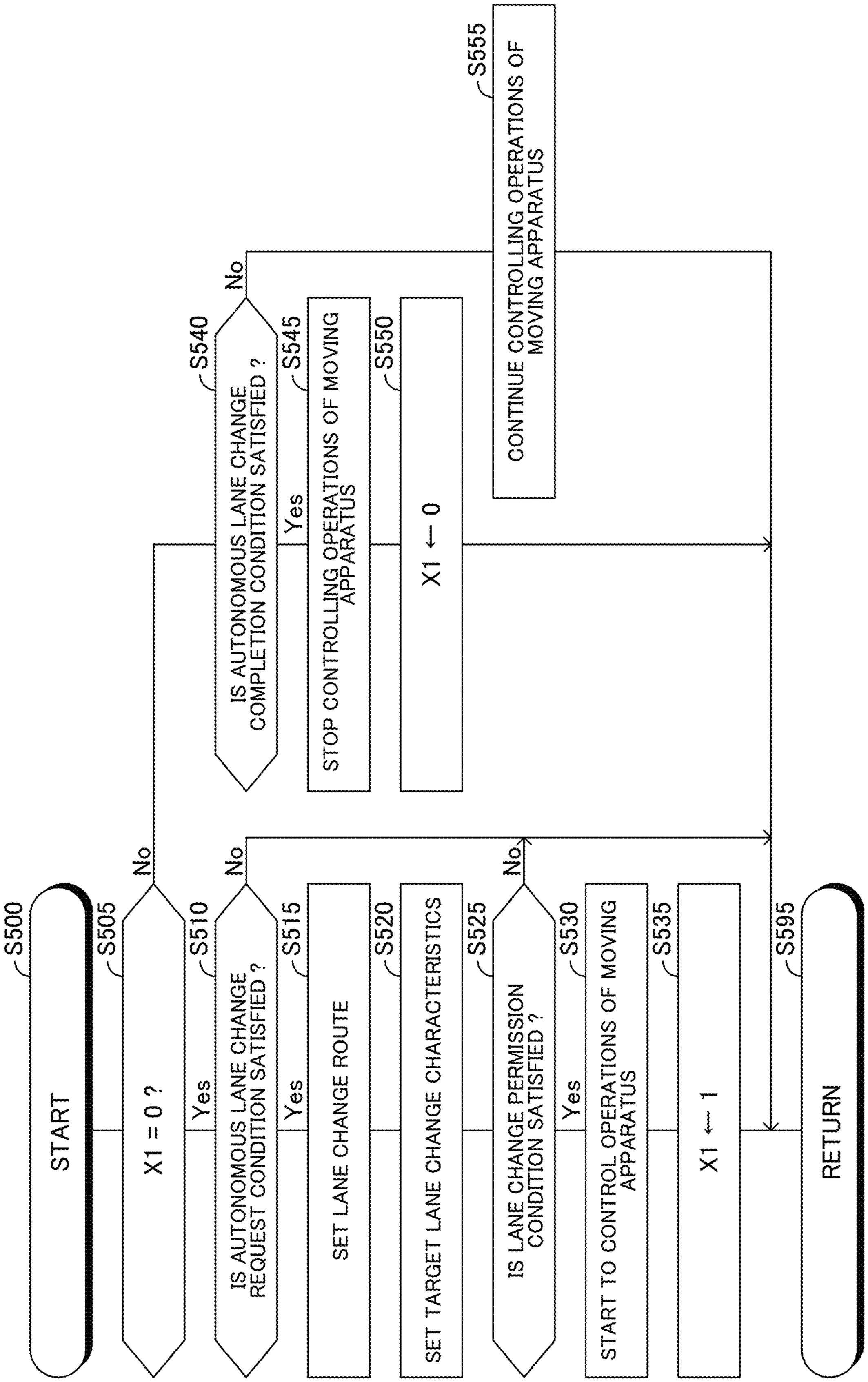
FIG. 5 is a view which shows a flowchart of a routine executed by the vehicle driving assistance apparatus according to the embodiment of the present invention.

The vehicle driving assistance apparatus 10 executes a routine shown in FIG. 4 at predetermined time intervals to acquire and memorize the actual lane change characteristics used in the lane change control, and executes a routine shown in FIG. 5 at predetermined time intervals to execute the lane change control when a predetermined condition is satisfied.

Therefore, at a predetermined timing, the vehicle driving assistance apparatus 10 starts a process from a step S400 of the routine shown in FIG. 4 and proceeds with the process to a step S405 to determine whether a manual lane change condition C1 is satisfied.

The manual lane change condition C1 is satisfied, for example, when the blinker lever 40 is operated during a manual driving, and is not satisfied when the manual lane change, i.e., the lane change of manually changing the lane of the own vehicle 100 is completed or when operation of the direction blinkers 30 is stopped without the manual lane change of the own vehicle 100 being carried out. It should be noted that the manual lane change condition C1 may include a condition that a neighboring lane exists on the side indicated by the direction blinkers 30 in operation. The neighboring lane is a lane in which vehicles can move in the same direction as the moving direction of the own vehicle 100, and is a lane which is adjacent to the present moving lane LN1. The vehicle driving assistance apparatus 10 can determine whether or not a neighboring lane is present on the side indicated by the direction blinkers 30 in operation based on the external environment information IO.

When the manual lane change condition C1 is satisfied, the vehicle driving assistance apparatus 10 determines "Yes" at the step S405 and proceeds with the process to a step S410 to acquire the lane change characteristics, and memorize the lane change characteristics as temporary lane change characteristics. Next, the vehicle driving assistance apparatus 10 proceeds with the process to a step S495 to terminate executing this routine once.

In the present embodiment, the lane change characteristics acquired at the step S410 are an actual required time T, an actual maximum lateral speed Vy_max, an actual maximum lateral acceleration rate Gy_max, an actual maximum lateral acceleration rate gradient Jy_max, an actual maximum lateral speed reaching time T_Vy_max, an actual lateral speed changing profile P_Vy, an actual lateral acceleration rate changing profile P_Gy, and an actual lateral acceleration rate gradient changing profile P_Jy.

The actual required time T is a period of time required from a point of time when the own vehicle 100 enters a predetermined state to a point of time when it transitions to a state different from the predetermined state during the manual driving or the manual lane change period. In particular, in the present embodiment, the actual required time T includes an actual lateral movement start time T1, an actual crossing start time T2, and an actual crossing finishing time T3.

The actual lateral movement start time T1 is a period of time required from a point of time when the driver carries out an operation indicating a driver's intention to carry out the manual lane change (in the present embodiment, an operation on the blinker lever 40) to a point of time when a movement of the own vehicle 100 laterally (i.e., a lateral movement of the own vehicle 100) is started during the manual driving. In an example shown in FIG. 2, the actual lateral movement start time T1 is a period of time taken from a point of time when the blinking of the right direction blinkers 31 starts to be activated by the blinker lever 40 being operated during the manual driving to a point of time when the lateral movement of the own vehicle 100 to the right side is started.

The actual crossing start time T2 is a period of time required from the point of time when the lateral movement of the own vehicle 100 is started to a point of time when the own vehicle 100 starts to cross the lane marking LM during the manual lane change period. In the example shown in FIG. 2, the actual crossing start time T2 is a period of time taken from the point of time when the lateral movement of the own vehicle 100 to the right is started to a point of time when a right front corner portion or a right front wheel of the own vehicle 100 reaches the lane marking LM. It should be noted that the lane marking LM is a line which separates the present moving lane LN1 and the designated neighboring lane LN2. Further, the vehicle driving assistance apparatus 10 recognizes the lane marking LM based on the external environment information IO.

In addition, the actual crossing finishing time T3 is a period of time required from the point of time when the own vehicle 100 starts to cross the lane marking LM to a point of time when the own vehicle 100 finishes crossing the lane marking LM during the manual lane change period. In the example shown in FIG. 2, the actual crossing finishing time T3 is a period of time required from the point of time when the right front corner portion or the right front wheel of the own vehicle 100 reaches the lane marking LM to a point of time when a left rear corner portion or a left rear wheel of the own vehicle 100 passes through the lane marking LM.

The vehicle driving assistance apparatus 10 acquires the actual required time T based on the external environment information IO (in particular, the image information IC).

Furthermore, in the present embodiment, the actual maximum lateral speed Vy_max is a maximum value of a lateral speed Vy (i.e., the moving speed of the own vehicle 100 in the lateral direction) during the manual lane change period. Also, the actual maximum lateral acceleration rate Gy_max is a maximum value of the lateral acceleration rate Gy (i.e., the acceleration rate of the own vehicle 100 in the lateral direction) during the manual lane change period. Also, the actual maximum lateral acceleration rate gradient Jy_max is a maximum value of a lateral acceleration rate gradient Jy (i.e., a rate of change of the acceleration rate of the own vehicle 100 in the lateral direction) during the manual lane change period.

The vehicle driving assistance apparatus 10 acquires the actual maximum lateral speed Vy_max, the actual maximum lateral acceleration rate Gy_max, and the actual maximum lateral acceleration rate gradient Jy_max based on the lateral acceleration rate Gy detected by the lateral acceleration rate sensor 52.

The actual maximum lateral speed reaching time T_Vy_max is a period of time required from the point of time when the lateral movement of the own vehicle 100 is started to a point of time when the lateral speed Vy of the own vehicle 100 reaches a maximum value during the manual lane change period.

The actual lateral speed changing profile P_Vy is a trajectory of the lateral speed Vy which changes during the manual lane change period. The actual lateral acceleration rate changing profile P_Gy is a trajectory of the lateral acceleration rate Gy which changes during the manual lane change period. The actual lateral acceleration rate gradient changing profile P_Jy is a trajectory of the lateral acceleration rate gradient Jy which changes during the manual lane change period.

The vehicle driving assistance apparatus 10 acquires the actual lateral speed changing profile P_Vy, the actual lateral acceleration rate changing profile P_Gy, and the actual lateral acceleration rate gradient changing profile P_Jy based on the lateral acceleration rate Gy detected by the lateral acceleration rate sensor 52.

For example, the actual lateral speed changing profile P_Vy, the actual lateral acceleration rate changing profile P_Gy, and the actual lateral acceleration rate gradient changing profile P_Jy are for an elapsed time Telsp since the manual lane change is started, or for a distance D between the lane marking LM and the own vehicle 100. For example, the actual lateral speed changing profile P_Vy, the actual lateral acceleration rate changing profile P_Gy, and the actual lateral acceleration rate gradient changing profile P_Jy are obtained by a statistical method based on a distribution of the lateral speed Vy, the lateral acceleration rate Gy, and the lateral acceleration rate gradient Jy with respect to the elapsed time Telsp from a point of time when the manual lane change is started when the manual lane change is carried out a plurality of times. Further, for example, the actual lateral speed changing profile P_Vy, the actual lateral acceleration rate changing profile P_Gy, and the actual lateral acceleration rate gradient changing profile P_Jy are obtained by a statistical method based on a distribution of the lateral speed Vy, the lateral acceleration rate Gy, and the lateral acceleration rate gradient Jy with respect to the distance D between the lane marking LM and the own vehicle 100 in the manual lane change when the manual lane change is carried out a plurality of times.

On the other hand, when the manual lane change condition C1 is not satisfied, the vehicle driving assistance apparatus 10 determines "No" at the step S405 and proceeds with the process to a step S415 to determine whether or not a manual lane change completion condition C2 is satisfied. The manual lane change completion condition C2 is satisfied when the manual lane change is completed. It should be noted that the manual lane change completion condition C2 is not satisfied, for example, when a process of a following step S420 is executed.

When the manual lane change completion condition C2 is satisfied, the vehicle driving assistance apparatus 10 proceeds with the process to a step S420 to memorize the temporary lane change characteristics memorized at the step S410 as the actual lane change characteristics. Next, the vehicle driving assistance apparatus 10 proceeds with the process to the step S495 to terminate executing this routine once.

On the other hand, when the manual lane change completion condition C2 is not satisfied, the vehicle driving assistance apparatus 10 proceeds with the process to a step S425 to determine whether or not a manual lane change non-implementation condition C3 is satisfied. The manual lane change non-implementation condition C3 is satisfied when the manual lane change condition C1 becomes unsatisfied without the manual lane change being carried out after the manual lane change condition C1 becomes satisfied. It should be noted that the manual lane change non-implementation condition C3 becomes unsatisfied, for example, when a process of a following step S430 is executed.

When the manual lane change non-implementation condition C3 is satisfied, the vehicle driving assistance apparatus 10 proceeds with the process to a step S430 to delete data of the temporary lane change characteristics memorized at the step S410. Next, the vehicle driving assistance apparatus 10 proceeds with the process to the step S495 to terminate executing this routine once.

On the other hand, when the manual lane change non-implementation condition C3 is not satisfied, the vehicle driving assistance apparatus 10 determines "No" at the step S425 and proceeds with the process directly to the step S495 to terminate executing this routine once.

Further, at a predetermined timing, the vehicle driving assistance apparatus 10 starts a process from a step S500 of the routine shown in FIG. 5 and proceeds with the process to a step S505 to determine whether or not a value of an autonomous lane changing flag X1 is "0". When the value of the autonomous lane changing flag X1 is "1", the autonomous lane changing flag X1 indicates that the lane change control is being executed, in other words, the execution of the lane change control is already started. When the value of the autonomous lane changing flag X1 is "0", the autonomous lane changing flag X1 indicates that the lane change control is not executed. The lane change control is a control of performing an autonomous lane change of the own vehicle 100 by the vehicle driving assistance apparatus 10 autonomously controlling the operations of the moving apparatus 20.

When the value of the autonomous lane changing flag X1 is "0" (that is, when the lane change control is being executed), the vehicle driving assistance apparatus 10 determines "Yes" at the step S505 and proceeds with the process to a step S510 to determine whether an autonomous lane change request condition C4 is satisfied. The autonomous lane change request condition C4 is a condition that the lane change of the own vehicle 100 by the lane change control is requested.

When the autonomous lane change request condition C4 is satisfied, the vehicle driving assistance apparatus 10 determines "Yes" at the step S510 and starts to execute the lane change control. That is, when the vehicle driving assistance apparatus 10 determines "Yes" at the step S510, the vehicle driving assistance apparatus 10 proceeds with the process to a step S515 to set a lane change route Rtgt.

The vehicle driving assistance apparatus 10 sets, as the lane change route Rtgt, a route along which the own vehicle 100 can be safely moved in the designated neighboring lane LN2 based on the external environment information IO. At this time, the vehicle driving assistance apparatus 10 may set the lane change route Rtgt considering a route along which the own vehicle 100 is moved to the designated neighboring lane LN2 by the manual lane change.

Next, the vehicle driving assistance apparatus 10 proceeds with the process to a step S520 to set the target lane change characteristics based on the actual lane change characteristics memorized at the step S420 of the routine illustrated in FIG. 4.

In the present embodiment, the target lane change characteristics set at the step S520 are a target required time Ttgt, a target maximum lateral speed Vy_max_tgt, a target maximum lateral acceleration rate Gy_max_tgt, a target maximum lateral acceleration rate gradient Jy_max_tgt, a target maximum lateral speed reaching time T_Vy_max_tgt, a target lateral speed changing profile P_Vy_tgt, a target lateral acceleration rate changing profile P_Gy_tgt, and a target lateral acceleration rate gradient changing profile P_Jy_tgt.

The target required time Ttgt is a target value of a period of time from a point of time when the own vehicle 100 enters a state corresponding to the predetermined state to a point of time when the own vehicle 100 transitions to a state corresponding to the other state. In particular, in the present embodiment, the target required time Ttgt includes a target lateral movement start time T1_tgt, a target crossing start time T2_tgt, and a target crossing finishing time T3_tgt. The target required time Ttgt is set based on the actual required time T. For example, the target required time Ttgt is set to a time equal to or approximately equal to the actual required time T.

The target lateral movement start time T1_tgt is a target value of a period of time from a point of time when an operation requesting the execution of the lane change control is carried out to a point of time of starting the lateral movement of the own vehicle 100. In the embodiment illustrated in FIG. 3, the target lateral movement start time T1_tgt is a target value of a period of time from a point of time when the driver requests the execution of the lane change control and the vehicle driving assistance apparatus 10 starts to blink the right direction blinkers 31 to a point of time when the vehicle driving assistance apparatus 10 starts the lateral movement of the own vehicle 100. The target lateral movement start time T1_tgt is set based on the actual lateral movement start time T1. For example, the target lateral movement start time T1_tgt is set to a time equal to or approximately equal to the actual lateral movement start time T1.

The target crossing start time T2_tgt is a target value of a period of time from a point of time of starting the lateral movement of the own vehicle 100 to a point of time of causing the own vehicle 100 to start to cross the lane marking LM. In the embodiment illustrated in FIG. 3, the target crossing start time T2_tgt is a target value of a period of time from the point of time of starting the lateral movement of the own vehicle 100 to the right to a point of time of causing the own vehicle 100 to start to cross the lane marking LM. The target crossing start time T2_tgt is set based on the actual crossing start time T2. For example, the target crossing start time T2_tgt is set to a time equal to or approximately equal to the actual crossing start time T2.

The target crossing finishing time T3_tgt is a target value of a period of time from the point of time of causing the own vehicle 100 to start to cross the lane marking LM to a point of time of finishing crossing the lane marking LM. The target crossing finishing time T3_tgt is set based on the actual crossing finishing time T3. For example, the target crossing finishing time T3_tgt is set to a time equal to or approximately equal to the actual crossing finishing time T3.

The target maximum lateral speed Vy_max_tgt is a target value of the maximum value of the lateral speed Vy during the execution of the lane change control. The target maximum lateral speed Vy_max_tgt is set based on the actual maximum lateral speed Vy_max. For example, the target maximum lateral speed Vy_max_tgt is set to a value equal to or approximately equal to the actual maximum lateral speed Vy_max.

The target maximum lateral acceleration rate Gy_max_tgt is a target value of the maximum value of the lateral acceleration rate Gy during the execution of the lane change control. The target maximum lateral acceleration rate Gy_max_tgt is set based on the actual maximum lateral acceleration rate Gy_max. For example, the target maximum lateral acceleration rate Gy_max_tgt is set to a value equal to or approximately equal to the actual maximum lateral acceleration rate Gy_max.

The target maximum lateral acceleration rate gradient Jy_max_tgt is a target value of the maximum value of the lateral acceleration rate gradient Jy during the execution of the lane change control. The target maximum lateral acceleration rate gradient Jy_max_tgt is set based on the actual maximum lateral acceleration rate gradient Jy_max. For example, the target maximum lateral acceleration rate gradient Jy_max_tgt is set to a value equal to or approximately equal to the actual maximum lateral acceleration rate gradient Jy_max.

The target maximum lateral speed reaching time T_Vy_max_tgt is a target value of a period of time from the point of time of starting the lateral movement of the own vehicle 100 to a point of time of causing the lateral speed Vy to reach a maximum value. In the embodiment illustrated in FIG. 3, the target maximum lateral speed reaching time T_Vy_max_tgt is a target value of a point of time from the point of time of starting the lateral movement of the own vehicle 100 to the right to a point of time of causing the lateral speed Vy to reach a maximum value. The target maximum lateral speed reaching time T_Vy_max_tgt is set based on the actual maximum lateral speed reaching time T_Vy_max. For example, the target maximum lateral speed reaching time T_Vy_max_tgt is set to a time equal to or approximately equal to the actual maximum lateral speed reaching time T_Vy_max.

Further, the target lateral speed changing profile P_Vy_tgt is a trajectory of the target value of the lateral speed Vy changed by the lane change control. The target lateral speed changing profile P_Vy_tgt is set based on the actual lateral speed changing profile P_Vy. For example, the target lateral speed changing profile P_Vy_tgt is set to the same profile or approximately the same profile as the actual lateral speed changing profile P_Vy.

The target lateral acceleration rate changing profile P_Gy_tgt is a trajectory of the target value of the lateral acceleration rate Gy changed by the lane change control. The target lateral acceleration rate changing profile P_Gy_tgt is set based on the actual lateral acceleration rate changing profile P_Gy. For example, the target lateral acceleration rate changing profile P_Gy_tgt is set to the same profile or approximately the same profile as the actual lateral acceleration rate changing profile P_Gy.

The target lateral acceleration rate gradient changing profile P_Jy_tgt is a trajectory of the target value of the lateral acceleration rate gradient Jy changed by the lane change control. The target lateral acceleration rate gradient changing profile P_Jy_tgt is set based on the actual lateral acceleration rate gradient changing profile P_Jy. For example, the target lateral acceleration rate gradient changing profile P_Jy_tgt is set to the same profile or approximately the same profile as the actual lateral acceleration rate gradient changing profile P_Jy.

After the vehicle driving assistance apparatus 10 executes a process of step S520, the vehicle driving assistance apparatus 10 proceeds with the process to a step S525 to determine whether or not a lane change permission condition C5 is satisfied. The lane change permission condition C5 is a condition that the vehicle driving assistance apparatus 10 can enter the own vehicle 100 into the designated neighboring lane LN2 safely. The lane change permission condition C5 is satisfied, for example, when there are no other vehicles in an area of the designated neighboring lane LN2 into which the vehicle driving assistance apparatus 10 enters the own vehicle 100. Alternatively, the lane change permission condition C5 is satisfied, for example, when there is no other vehicle contacting the own vehicle 100 when the vehicle driving assistance apparatus 10 moves the own vehicle 100 along the lane change route Rtgt set at the step S515 in accordance with the target lane change characteristics set at the step S520.

When the vehicle driving assistance apparatus 10 determines “Yes” at the step S525, the vehicle driving assistance apparatus 10 proceeds with the process to a step S530 to start to control the operations of the moving apparatus 20 to move the own vehicle 100 along the lane change route Rtgt set at the step S515 in accordance with the target lane change characteristics set at the step S520.

Next, the vehicle driving assistance apparatus 10 proceeds with the process to a step S535 to set the value of the autonomous lane changing flag X1 to “1”. Next, the vehicle driving assistance apparatus 10 proceeds with the process to a step S595 to terminate executing this routine once.

On the other hand, when the vehicle driving assistance apparatus 10 determines “No” at the step S510 or the step S525, the vehicle driving assistance apparatus 10 proceeds with the process directly to step S595 to terminate executing this routine once.

In addition, when the vehicle driving assistance apparatus 10 determines “No” at the step S505, the vehicle driving assistance apparatus 10 proceeds with the process to a step S540 to determine whether or not an autonomous lane change completion condition C6 is satisfied.

When the vehicle driving assistance apparatus 10 determines “Yes” at the step S540, the vehicle driving assistance apparatus 10 proceeds with the process to a step S545 to stop controlling the operations of the moving apparatus 20. Next, the vehicle driving assistance apparatus 10 proceeds with the process to a step S550 to set the value of the autonomous lane changing flag X1 to “0”. Next, the vehicle driving assistance apparatus 10 proceeds with the process to the step S595 to terminate executing this routine once.

On the other hand, when the vehicle driving assistance apparatus 10 determines “No” at the step S540, the vehicle driving assistance apparatus 10 proceeds with the process to a step S555 to continue controlling the operations of the moving apparatus 20. Next, the vehicle driving assistance apparatus 10 proceeds with the process to the step S595 to terminate executing this routine once.

The operations of the vehicle driving assistance apparatus 10 have been described.

When the driver manually carries out the lane change of the own vehicle 100, the driver’s preferences regarding the lane change of the own vehicle 100 are reflected in the actual required time T (in particular, the actual lateral movement start time T1, the actual crossing start time T2, and the actual crossing finishing time T3), the actual maximum lateral speed Vy_max, the actual maximum lateral acceleration rate Gy_max, the actual maximum lateral acceleration rate gradient Jy_max, the actual maximum lateral speed reaching time T_Vy_max, the actual lateral speed changing profile P_Vy, the actual lateral acceleration rate changing profile P_Gy, and the actual lateral acceleration rate gradient changing profile P_Jy.

According to the vehicle driving assistance apparatus 10, the target lateral movement start time T1_tgt, the target crossing start time T2_tgt, the target crossing finishing time T3_tgt, the target maximum lateral speed Vy_max_tgt, the target maximum lateral acceleration rate Gy_max_tgt, the target maximum lateral acceleration rate gradient Jy_max_tgt, the target maximum lateral speed reaching time T_Vy_max_tgt, the target lateral speed changing profile P_Vy_tgt, the target lateral acceleration rate changing profile P_Gy_tgt, and the target lateral acceleration rate gradient changing profile P_Jy_tgt are set based on the actual lateral movement start time T1, the actual crossing start time T2, the actual crossing finishing time T3, the actual maximum lateral speed Vy_max, the actual maximum lateral acceleration rate Gy_max, the actual maximum lateral acceleration rate gradient Jy_max, the actual maximum lateral speed reaching time T_Vy_max, the actual lateral speed changing profile P_Vy, the actual lateral acceleration rate changing profile P_Gy, and the actual lateral acceleration rate gradient changing profile P_Jy. Then, the autonomous lane change is performed in accordance with the target lateral movement start time T1_tgt, the target crossing start time T2_tgt, the target crossing finishing time T3_tgt, the target maximum lateral speed Vy_max_tgt, the target maximum lateral acceleration rate Gy_max_tgt, the target maximum lateral acceleration rate gradient Jy_max_tgt, the target maximum lateral speed reaching time T_Vy_max_tgt, the target lateral speed changing profile P_Vy_tgt, the target lateral acceleration rate changing profile P_Gy_tgt, and the target lateral acceleration rate gradient changing profile P_Jy_tgt. Therefore, the vehicle driving assistance apparatus 10 can ensure the autonomous lane change of the own vehicle 100 in a manner preferred by the driver.

It should be noted that the present invention is not limited to the above-described embodiments, and various modifications can be adopted within the scope of the present invention.

What is claimed is:

1. A vehicle driving assistance apparatus, comprising an electronic control unit which executes a lane change control of autonomously performing a lane change of an own vehicle, the electronic control unit being configured to:

acquire actual lane change characteristics during a manual lane change period, the manual lane change period being a period of time when an operator of the own vehicle carries out a manual lane change of manually changing lanes of the own vehicle, the actual lane change characteristics being characteristics relating to the manual lane change;

and perform an autonomous lane change of changing lanes of the own vehicle by the lane change control in accordance with target lane change characteristics set based on the actual lane change characteristics, wherein the electronic control unit is further configured to:

acquire, as the actual lane change characteristics, (i) an actual required time and (ii) an actual maximum lateral speed, the actual required time being a period of time from a point of time when the operator brings a state of the own vehicle into a first state to a point of time when the operator brings the state of the own vehicle into a second state other than the first state, and the actual maximum lateral speed being a maximum value of a lateral speed which is a moving speed of the own vehicle in a lateral direction of the own vehicle;

and set, as the target lane change characteristics, (i) a target required time based on the actual required time and (ii) a target maximum lateral speed based on the actual maximum lateral speed, the target required time being a target period of time from a point of time when the electronic control unit brings the state of the own vehicle into the first state to a point of time when the electronic control unit brings the state of the own vehicle into the second state, and the target maximum lateral speed being a target value of the maximum value of the lateral speed, wherein the electronic control unit is further configured to:

acquire, as the actual lane change characteristics, (i) an actual maximum lateral acceleration rate and (ii) an actual maximum lateral acceleration rate gradient, the actual maximum lateral acceleration rate being a maximum value of a lateral acceleration rate which is an acceleration rate of the own vehicle in the lateral direction, and the actual maximum lateral acceleration rate gradient being a maximum value of a lateral acceleration rate gradient which is a rate of change of the acceleration rate of the own vehicle;

and set, as the target lane change characteristics, (i) a target maximum lateral acceleration rate based on the actual maximum lateral acceleration rate and (ii) a target maximum lateral acceleration rate gradient based on the actual maximum lateral acceleration rate gradient, the target maximum lateral acceleration rate being a target value of the maximum value of the lateral acceleration rate, and the target maximum lateral acceleration rate gradient being a target value of the maximum value of the lateral acceleration rate gradient.

2. The vehicle driving assistance apparatus according to claim 1, wherein the electronic control unit is configured to:

acquire, as the actual lane change characteristics, an actual maximum lateral speed reaching time, the actual maximum lateral speed reaching time being a period of time from a point of time when the operator starts to move the own vehicle in the lateral direction to a point of time when the lateral speed reaches a maximum lateral speed;

set, as the target lane change characteristics, a target maximum lateral speed reaching time, the target maximum lateral speed reaching time being a target period of time from a point of time when the electronic control unit starts to move the own vehicle in the lateral direction to a point of time when the electronic control unit causes the lateral speed to reach the maximum lateral speed.

3. A vehicle driving assistance apparatus, comprising an electronic control unit which executes a lane change control of autonomously performing a lane change of an own vehicle, the electronic control unit being configured to: acquire actual lane change characteristics during a manual lane change period, the manual lane change period being a period of time when an operator of the own vehicle carries out a manual lane change of manually changing lanes of the own vehicle, the actual lane change characteristics being characteristics relating to the manual lane change; and perform an autonomous lane change of changing lanes of the own vehicle by the lane change control in accordance with target lane change characteristics set based on the actual lane change characteristics, wherein the electronic control unit is further configured to: acquire, as the actual lane change characteristics, (i) an actual required time and (ii) an actual maximum lateral speed, the actual required time being a period of time from a point of time when the operator brings a state of the own vehicle into a first state to a point of time when the operator brings the state of the own vehicle into a second state other than the first state, and the actual maximum lateral speed being a maximum value of a lateral speed which is a moving speed of the own vehicle in a lateral direction of the own vehicle; and set, as the target lane change characteristics, (i) a target required time based on the actual required time and (ii) a target maximum lateral speed based on the actual maximum lateral speed, the target required time being a target period of time from a point of time when the electronic control unit brings the state of the own vehicle into the first state to a point of time when the electronic control unit brings the state of the own vehicle into the second state, and the target maximum lateral speed being a target value of the maximum value of the lateral speed the target required time being a target period of time from a point of time when the electronic control unit brings the state of the own vehicle into the first state to a point of time when the electronic control unit brings the state of the own vehicle into the second state, and the target maximum lateral speed being a target value of the maximum value of the lateral speed wherein the electronic control unit is further configured to: acquire, as the actual lane change characteristics, (i) an actual lateral speed changing profile, (ii) an actual lateral acceleration rate changing profile, and (iii) an actual lateral acceleration rate gradient changing profile, the actual lateral speed changing profile being a trajectory of the lateral speed which changes during the manual lane change period, the actual lateral acceleration rate changing profile being a trajectory of a lateral acceleration rate which is an acceleration rate of the own vehicle in the lateral direction and changes during the manual lane change period, and the actual lateral acceleration rate gradient changing profile being a trajectory of a lateral acceleration rate gradient which is a rate of change of the acceleration rate of the own vehicle and changes during the manual lane change period; and set, as the target lane change characteristics, (i) a target lateral speed changing profile based on the actual lateral speed changing profile, (ii) a target lateral acceleration rate changing profile based on the actual lateral acceleration rate changing profile, and (iii) a target lateral acceleration rate gradient changing profile based on the actual lateral acceleration rate gradient changing profile, the target lateral speed changing profile being a trajectory of a target value of the lateral speed to be changed by the lane change control, the target lateral acceleration rate changing profile being a trajectory of a target value of the lateral acceleration rate to be changed by the lane change control, and the target lateral acceleration rate gradient changing profile being a trajectory of a target value of the lateral acceleration rate gradient to be changed by the lane change control.

4. A vehicle driving assistance apparatus, comprising an electronic control unit which executes a lane change control of autonomously performing a lane change of an own vehicle, the electronic control unit being configured to: acquire actual lane change characteristics during a manual lane change period, the manual lane change period being a period of time when an operator of the own vehicle carries out a manual lane change of manually changing lanes of the own vehicle, the actual lane change characteristics being characteristics relating to the manual lane change; and perform an autonomous lane change of changing lanes of the own vehicle by the lane change control in accordance with target lane change characteristics set based on the actual lane change characteristics, wherein the electronic control unit is further configured to: acquire, as the actual lane change characteristics, (i) an actual required time and (ii) an actual maximum lateral speed, the actual required time being a period of time from a point of time when the operator brings a state of the own vehicle into a first state to a point of time when the operator brings the state of the own vehicle into a second state other than the first state, and the actual maximum lateral speed being a maximum value of a lateral speed which is a moving speed of the own vehicle in a lateral direction of the own vehicle; and set, as the target lane change characteristics, (i) a target required time based on the actual required time and (ii) a target maximum lateral speed based on the actual maximum lateral speed, the target required time being a target period of time from a point of time when the electronic control unit brings the state of the own vehicle into the first state to a point of time when the electronic control unit brings the state of the own vehicle into the second state, and the target maximum lateral speed being a target value of the maximum value of the lateral speed the target required time being a target period of time from a point of time when the electronic control unit brings the state of the own vehicle into the first state to a point of time when the electronic control unit brings the state of the own vehicle into the second state, and the target maximum lateral speed being a target value of the maximum value of the lateral speed wherein the electronic control unit is further configured to: acquire, as the actual required time, (i) an actual lateral movement start time, (ii) an actual crossing start time, and (iii) an actual crossing finishing time, the actual lateral movement start time being a period of time from a point of time when the operator starts to carry out an operation indicating an intension to carry out the manual lane change to a point of time when the operator starts to move the own vehicle in the lateral direction, the actual crossing start time being a period of time from the point of time when the operator starts to move the own vehicle in the lateral direction to a point of time when the own vehicle starts to cross a lane marking, and the actual crossing finishing time being a period of time from the point of time when the own vehicle starts to cross the lane marking to a point of time when the own vehicle finishes crossing the lane marking; and set, as the target required time, (i) a target lateral movement start time based on the actual lateral movement start time, (ii) a target crossing start time based on the actual crossing start time, and (iii) a target crossing finishing time based on the actual crossing finishing time, the target lateral movement start time being a target period of time from a point of time when the operator carries out an operation of requesting an execution of the lane change control to a point of time when the electronic control unit starts to move the own vehicle in the lateral direction, the target crossing start time being a target period of time from the point of time when the electronic control unit starts to move the own vehicle in the lateral direction to a point of time when the electronic control unit causes the own vehicle to start to cross the lane marking, and the target crossing finishing time being a target period of time from the point of time when the electronic control unit causes the own vehicle to start to cross the lane marking to a point of time when the electronic control unit causes the own vehicle to finish crossing the lane marking.

5. The vehicle driving assistance apparatus according to claim 3, wherein the electronic control unit is configured to:

acquire, as the actual lane change characteristics, an actual maximum lateral speed reaching time, the actual maximum lateral speed reaching time being a period of time from a point of time when the operator starts to move the own vehicle in the lateral direction to a point of time when the lateral speed reaches a maximum lateral speed;

set, as the target lane change characteristics, a target maximum lateral speed reaching time, the target maximum lateral speed reaching time being a target period of time from a point of time when the electronic control unit starts to move the own vehicle in the lateral direction to a point of time when the electronic control unit causes the lateral speed to reach the maximum lateral speed.

6. The vehicle driving assistance apparatus according to claim 4, wherein the electronic control unit is configured to:

acquire, as the actual lane change characteristics, an actual maximum lateral speed reaching time, the actual maximum lateral speed reaching time being a period of time from a point of time when the operator starts to move the own vehicle in the lateral direction to a point of time when the lateral speed reaches a maximum lateral speed;

set, as the target lane change characteristics, a target maximum lateral speed reaching time, the target maximum lateral speed reaching time being a target period of time from a point of time when the electronic control unit starts to move the own vehicle in the lateral direction to a point of time when the electronic control unit causes the lateral speed to reach the maximum lateral speed.

* * * * *